United States Patent
Reimers

[11] Patent Number: 5,749,424
[45] Date of Patent: May 12, 1998

[54] POWERED CART FOR GOLF BAG

[76] Inventor: Eric W. Reimers, 1235 Starwood, Missoula, Mont. 59802

[21] Appl. No.: 378,662

[22] Filed: Jan. 26, 1995

[51] Int. Cl.[6] .................................................. B62D 51/04
[52] U.S. Cl. ........................ 180/19.2; 180/214; 180/65.5
[58] Field of Search ............................... 180/19.1, 19.2, 180/11, 12, 13, 167, 65.1, 65.5; 280/DIG. 5

[56] References Cited

U.S. PATENT DOCUMENTS

| | | | |
|---|---|---|---|
| 3,059,713 | 10/1962 | Beggs | 280/DIG. 5 X |
| 3,705,387 | 12/1972 | Stern et al. | 180/168 X |
| 3,871,464 | 3/1975 | Eden | 180/19.2 |
| 3,896,893 | 7/1975 | Willis | 180/19.1 |
| 3,941,198 | 3/1976 | Kappas | 280/DIG. 5 X |
| 3,948,332 | 4/1976 | Tyner | 180/19.1 |
| 4,063,612 | 12/1977 | Weiss | 180/12 |
| 4,106,583 | 8/1978 | Nemeth | 180/6.5 X |
| 4,356,875 | 11/1982 | Clune | 280/DIG. 5 X |
| 4,538,696 | 9/1985 | Carter | 280/DIG. 5 X |
| 4,570,731 | 2/1986 | Oaks | 280/DIG. 5 X |
| 4,570,732 | 2/1986 | Craven | 180/19.3 |
| 4,705,293 | 11/1987 | Hart | 280/DIG. 5 X |
| 5,137,103 | 8/1992 | Cartmell | 280/DIG. 5 X |
| 5,180,023 | 1/1993 | Reimers | 180/19.1 |
| 5,375,673 | 12/1994 | McCall et al. | 280/DIG. 5 X |

*Primary Examiner*—Anne Marie Boehler
*Attorney, Agent, or Firm*—Michael J. Hughes; Raymond E. Roberts

[57] ABSTRACT

A powered golf bag cart (10) is shown which includes a frame assembly (20), a free wheel assembly (22), a drive wheel assembly (24), a power delivery assembly (26), a steering assembly (28), and a control assembly (30). For compact storage, the frame assembly (20) of the cart (10) further includes a base portion (32), central portion (34), and handle portion (36) which collapse into one another. The power delivery assembly (26) includes a drive motor (144), located in the drive wheel assembly (24). The cart (10) is steered by the steering assembly (28) changing orientation of the drive wheel assembly (24), under control of a user operating the control assembly (30). In this manner all control and motive force is applied via a single ground contacting surface in the drive wheel assembly (24). Possible options include a parallelogram positioner (90) which permits a left free wheel (92) and a right free wheel (94) within the free wheel assembly (22) to be selectably collapsed inward against the frame assembly (20), for even more compact storage.

6 Claims, 6 Drawing Sheets

POWERED CART FOR GOLF BAG

TECHNICAL FIELD

This invention relates generally to golfing equipment, and more particularly to powered carts for transporting golf bags.

BACKGROUND ART

One of the draw backs to the game of golf is the rather large amount of equipment that is required to play, at least by "modern" standards. At a minimum, a game of golf requires the player to transport a number of different clubs across the course. While many players have the physical endurance to carry a bag from hole to hole, particularly long courses can be taxing. In addition, some players may be either unable or unwilling to carry their clubs overlong distances.

Caddies, manually pulled carts and automobile-like driven golf carts can relieve the club carrying burden of a player. However, caddies are both expensive and anachronistic and pull carts have proven at times to be almost as much work as carrying the equipment. Standard "golf carts" which carry the player as well as the equipment may not be available at all times on all courses. Further, this type of personnel cart is often limited by course regulations to paved cart paths, frequently inconveniently located with respect to the player's ball, thus resulting in improper club selection. These factors have led to the creation of golf bag carts.

Golf bag carts are mobile structures designed to transport a golf bag laden with clubs. They come in a variety of designs including hand powered carts and motor powered carts. Hand powered carts are typically hand pulled or hand pushed. Motor powered carts typically involve powering one or more bag cart wheels by a motor.

There has been no shortage of efforts to provide the ideal powered golf bag cart. A large number of such efforts have been reflected in issued United States Patents. Many of these are minor variants from the conventional pull car, while others are radical departures in appearance and motive means. All are intended to allow the golfer to transport the clubs and peripheral equipment to the vicinity of the ball easily, while retaining the benefits of walking.

Those which resemble conventional pull carts include: U.S. Pat. No. 3,867,993, issued to Iizuka; U.S. Pat. No. 3,71 9,247 and U.S. Pat. No. 3,753,473, both issued to Hollis; U.S. Pat. No. 3,893,532 issued to Perlowin; U.S. Pat. No. 3,907,056, issued to Thomas, III; U.S. Pat. No. 3,948,332, issued to Tyner; U.S. Pat. No. 3,952,821, issued to Craven; U.S. Pat. No. 4,106,583, issued to Nemeth; and U.S. Pat. No. 4,657,100, issued to Lewis. All of these include a conventional appearing spindly cart, with motor adaptations to provide the wheels with driving power.

Several patents which represent carts which are different in appearance and structure from the traditional pull cart include: U.S. Pat. No. 3,871,464, issued to Eden; U.S. Pat. No. 3,896,893, issued to Willis; U.S. Pat. No. 4,063,612, issued to Weiss; U.S. Pat. No. 4,570,732, issued to Oaks; and U.S. Pat. No. 5,180,023, issued to the present inventor, Reimers. These present different approaches to achieving the same goals, each with some success.

However, all of the prior art suffers from one or more of the following disadvantages: (1) the device is too heavy; (2) the device is too bulky; (3) the device does not have an adjustable height handle; (4) the device is not easily collapsible; (5) the device does not have a steering offset correction; (6) the device lacks stability when used; (7) the device cannot be remotely controlled. None of the prior art effectively provides a golf bag carrier design which successfully addresses all the above mentioned concerns.

SUMMARY OF THE INVENTION

Accordingly, it is an object of the present invention to provide a compact golf bag cart which is easily storable and transportable, yet strong and stable in use;

It is another object of the present invention to provide a lightweight golf bag cart which is durable;

It is yet another object of the present invention to provide a golf bag cart with a manual operation handle which has an adjustable effective height to conform to the stature and comfort of the user;

It is a further object of the present invention to provide a single wheel drive mechanism for consistency of control and avoidance of power-balancing difficulties;

It is another object of the present invention to provide a collapsible golf bag cart that is easily collapsed and expanded for rapid adaptation for use and storage, and which has a small footprint for storage;

It is a still further object of the invention to provide a single rear wheel drive structure for stability and ease of use, even in the event of power or mechanism failure, with adaptability for either rear wheel or front wheel steering;

It is another object of the present invention to provide a golf bag cart that is stable over a variety of types of terrain;

It is still another object to provide a power and control structure with a minimum amount of exposed wiring, and with essentially no wiring which requires bending and folding during the transition to or from the storage mode to the use mode; and It yet another object of the present invention to provide a golf bag cart that can be controlled easily by remote control or by proximity controls from the handle, as well as manually.

Briefly, the preferred embodiment of the present invention is a collapsible, golf bag cart that is powered by a dc electric motor. The preferred embodiment includes a collapsible frame for supporting the golf bag and the cart mechanisms, a pair of opposed free spinning front wheel assemblies, a drive wheel assembly, a power assembly, a steering control assembly, and a user operated control system assembly.

The collapsible frame includes a handle portion which folds into a central frame portion, which in turn folds into a base portion. The base member is supported above the ground by a free wheel assembly including a left front wheel and a right front wheel, and a rear drive wheel assembly. Both the left and right front wheels are mounted on cantilevers which allow the wheels to pivot away from the base member on a left lockable pivot arm and a right lockable pivot arm, respectively. Steering rods are also provided to the front wheels in one preferred structure. The drive wheel assembly includes a rear wheel with an accompanying drive motor fixed to a caster arm that extends in a downward direction from the base plate member. The caster arm, and correspondingly, the rear wheel with drive motor, rotate about an axis perpendicular to the base plate member.

Another, alternative, steering assembly is adapted to steer the device by the rear drive wheel, rather than the front whelps. This steering assembly includes, self positioning gimbals connecting a steering rod and a rod driver intermediate the drive wheel and the frame.

A control system assembly enables the golfer to control the steering action and the speed of the drive motor and includes interchangeable remote controller units adapted to mount on the handle portion, or to be carried separately, receiver means secured to the frame member and control electronics for controlling the drive motor and steering assemblies in response to operator input. In the preferred structure, there is no hard wiring between the controller unit on the handle and the receiver subassembly.

An advantage of the present invention is that it provides a golf bag cart that is easily collapsible for compact storage, while being large and strong enough to support cumbersome and heavy golf bags and to retain stability in use on variable golf course terrain.

Another advantage of the invention is that it provides stable, self-centering, self-correcting and easily controlled steering, in both steering embodiments.

A further advantage of the present invention is that it provides a golf bag cart which maintains good balance characteristics on a wide variety of terrain conditions, while being light enough for the average golfer to easily handle manually, if needed.

Yet another advantage of the invention is that it provides a powered cart that may be successfully utilized in unpowered mode, if made necessary by power or mechanical failure.

A still further advantage of the golf bag cart of the present invention is that it is partially self-braking, thus aiding in preventing runaways on steep inclines, even under power failure conditions.

Another advantage of the invention is that the power source (battery) is easily removable for handling and recharging, thus separating the weight into component parts so that the user need not lift the combined weight at once.

Yet another advantage is that the frame member is adapted to absorb and minimize shock to equipment, while also minimizing degradable components.

Still another advantage is that the component parts, both mechanical and electronic, of the golf bag cart are modular so that they may be easily replaced and interchanged, thus minimizing downtime.

A further advantage of the invention is that the spectrum smearing technique permits increased range of remote control on a variety of frequencies without a corresponding increased power requirement, and with less RF interference.

Still another advantage of the invention is that the detachable controller units provide ease of use, interchangeability and range, while minimizing wiring which would interfere with collapsibility and be subject to stress failures.

A still further advantage of the present invention is that a myriad of electronic feature, including auto-shutoff, steering power delay, kickout circuitry, visible status lights and other diagnostic features provide user-transparent safeguards against breakdown and malfunction related incidents.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWING

FIG. 4, parts 4a and 4b, is a top plan view of one of the front free wheel subassemblies, shown in use mode and in a partially collapsed orientation, respectively;

BEST MODE OF CARRYING OUT THE INVENTION

The best presently known mode for carrying out the present invention is an electrically powered golf bag cart for transporting a golf bag. The powered cart for a golf bag is designed to be extendible into an operational configuration ("course" or "use" mode) and to collapse into a compact structure ("store" or "storage" mode) that is easy to store and transport. The golf bag cart is electronically controlled by the user, either from the immediate vicinity of the cart or from a slightly remote location (up to about 60 yards). The present invention is intended for use by those who wish to walk on a round of golf, while avoiding the strain of carrying or pulling the golf bag and equipment.

The preferred embodiment of the present invention is a collapsible powered cart for a golf bag which is illustrated in the several figures of the drawing and designated throughout by the general reference character 10. As is shown in phantom in the perspective view of FIG. 1, the cart 10 is adapted to support any of a variety of conventional golf bags 12 thereon. A typical generalized golf bag 12 is shown in phantom in FIG. 1. Ordinarily, the golf bag 12 will contain a plurality of golf clubs 14 (also shown in phantom in FIG. 1) and additional paraphernalia not shown, such as balls, tees, a towel and the like, all of which provide mass which the golfer would ordinarily carry or pull as the golfer walks on a golf round. The golf bag 12 is an elongated structure which is generally disposed about a longitudinal golf bag axis 16. The golf bag axis 16 is maintained so as to be offset from vertical with respect to the ground surface during usage in order to facilitate club presentation, insertion and removal.

Figure 1:
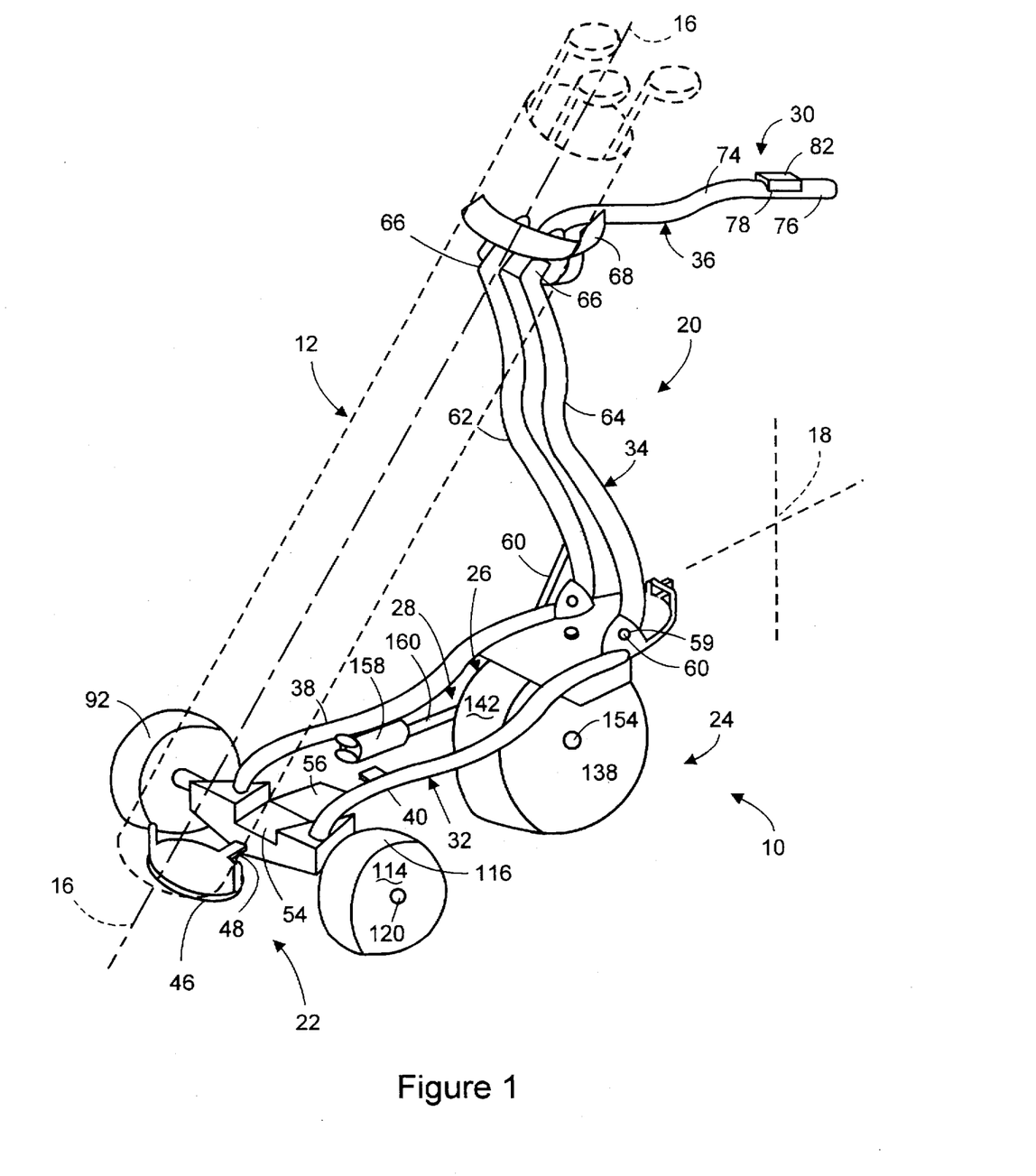
FIG. 1 is a perspective view of the preferred embodiment in the use mode.
Figure 2:
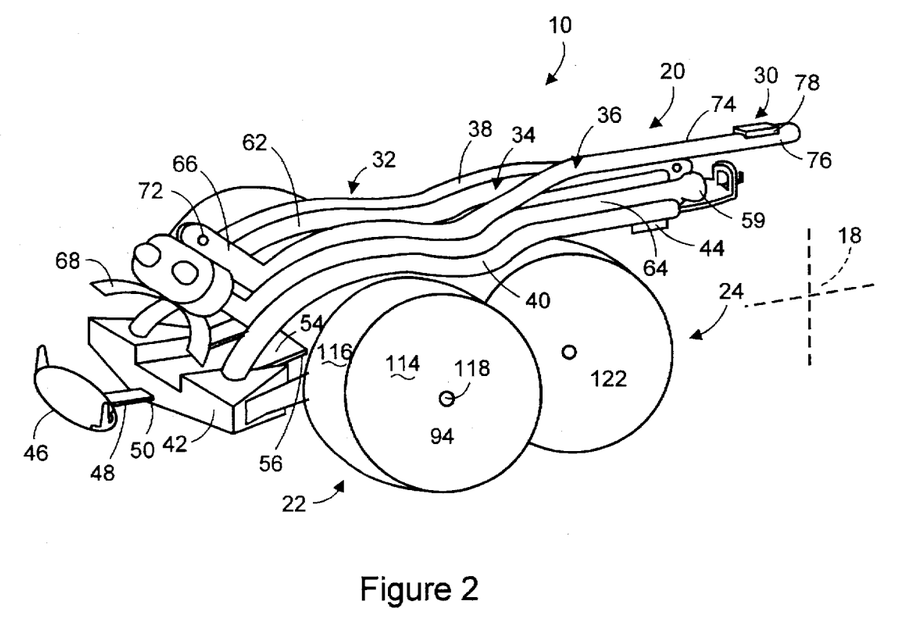
FIG. 2 is a perspective view of the preferred embodiment in the store mode.
Figure 3:
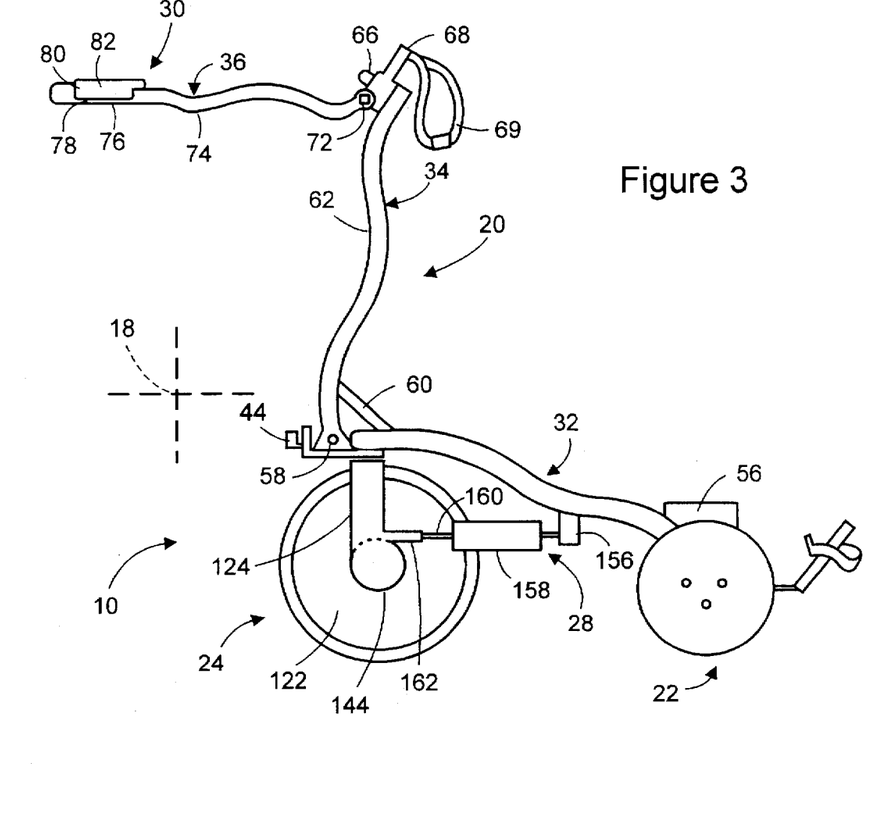
FIG. 3 is a side elevational view of the preferred embodiment in the use mode.

As illustrated in the perspective view of FIG. 1 and the side elevational view of FIG. 3, the golf bag cart 10 is shown as having been extended into the use mode for support of the golf bag 12 and for actual use on the course. The perspective view of FIG. 2, on the other hand, illustrates the store (storage) mode of the cart 10, wherein it is collapsed for storage or transport, as in the trunk of a vehicle. In this mode it is characterized by a compact footprint and volume. On this orientation, the cart 10 is not adapted to support a golf bag 12, so it is intended that the bag 12 will be removed prior to conversion.

The cart 10 is constructed to generally symmetrical about a longitudinal (vertical) bisecting plane 18. In the use mode (FIG. 1) the bisecting plane 18 will also be aligned with the bag axis 16, provided that the golf bag 12 is properly mounted.

Figure 4A:
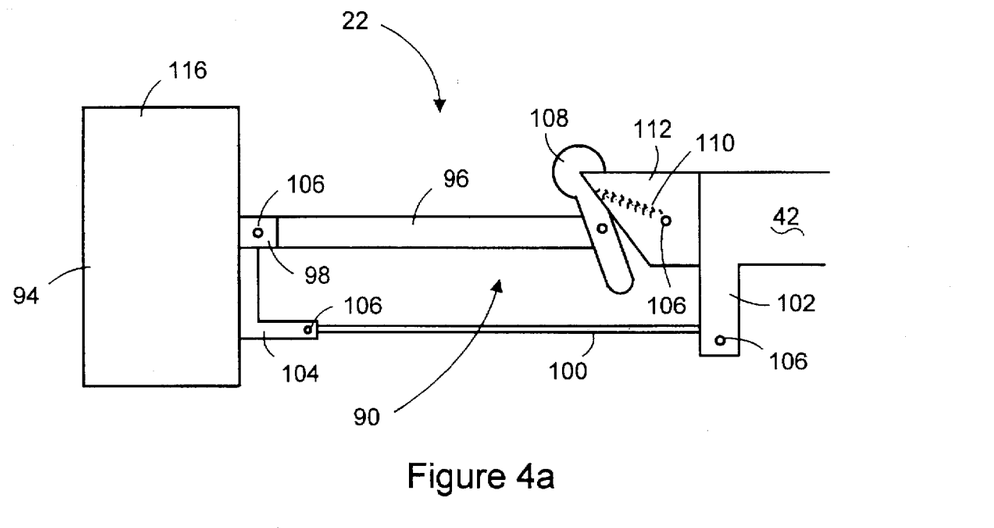
Figure 4B:
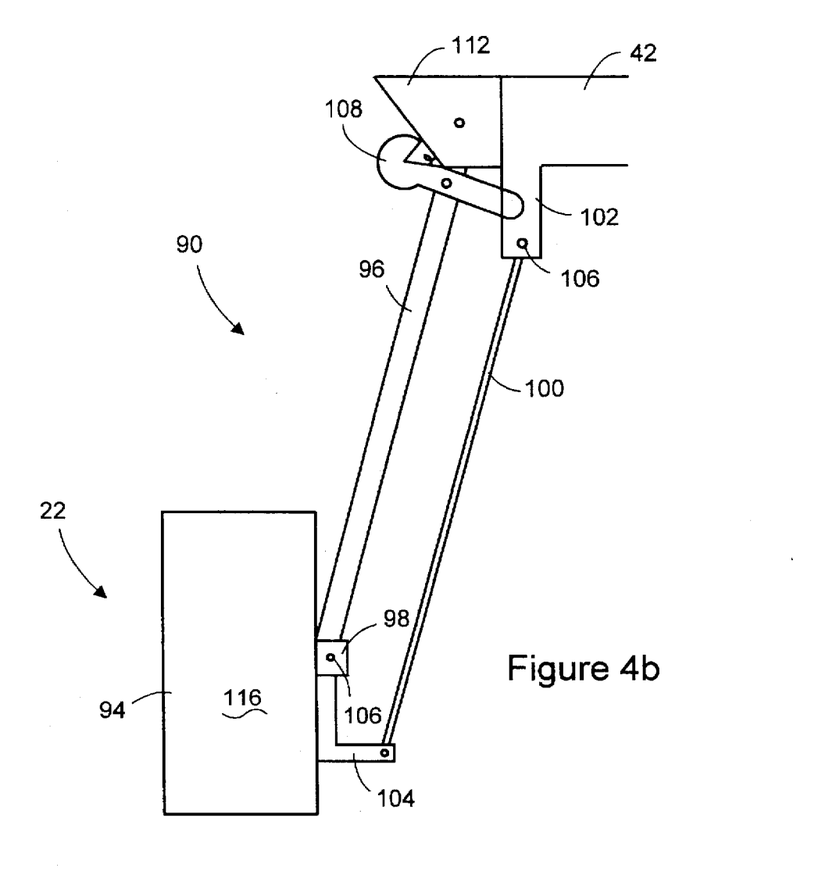

The cart 10 is a unitary construction but may be considered as a combination of several assemblies. The primary functional and structural assemblies of the cart 10 are: a frame assembly 20 (illustrated particularly in FIGS. 1, 2 and 3; a free wheel assembly 22 (illustrated primarily in FIGS. 1 and 4); a drive wheel assembly 24 (illustrated primarily in FIGS. 3, 5 and 6); a power delivery assembly 26 (shown especially in FIGS. 1, 3 and 5); a steering assembly 28 (shown especially and FIGS. 5 and 6) with a corresponding alternate embodiment, a front wheel steering assembly 728 (shown in FIG. 7) and a control assembly (illustrated primarily in FIGS. 2,8 and 9).

Referring now particularly to FIGS. 1,2 and 3, the frame assembly 20 is shown to be formed of a variety of interconnected members. The frame assembly 20 provides the structural integrity for the cart 10 as well as the immediate support for the golf bag 12. The frame assembly 20 has three primary portions, hingedly connected for collapsibility. These are a base portion 32, fixed with respect to the wheel assemblies 22 and 24, a central portion 34 for nesting immediately within the base portion 32 in the store mode and a handle portion 36 for nesting in the center of the other portions in the compact store mode.

The base portion 32 includes primary structural members in the form of a left base spar tube 38 and a right base spar tube 40 connected at their extremities by a front base buttress 42 and a rear base plate 44. A bag bottom bracket 46 extends forward on an extension slide 48 from the front base buttress 42 to provide angled bottom support for the golf bag 12. The amount of extension is adjustable to correspond to the size of the golf bag 12 being supported and the position may be secured by the user by using a slide catch 50. A restraining cinch 52, preferably elastic for pulling the base of the golf bag 12 against the bag bottom bracket 48 is provided to prevent inadvertent dislodgment of the golf bag 12.

A rearward extending portion of the front base buttress member 42 forms a battery support bracket 54 upon which a battery 56 (described in conjunction with the power delivery assembly 26) is removably mounted. The battery support bracket 54 has rear restraints which prevent the battery 56 from sliding rearward. The extension slide 48 also is adapted to extend to a position overlapping the battery support bracket 52 in the store mode when the battery 56 is not present. For further functionality in the use mode, the rearward end of the extension slide is formed to force the battery 56 rearward against the battery support bracket 54 so as to help retain the battery 56 in position during use.

The rear base plate 44 provides the interface between the frame assembly 20 and the drive wheel assembly 22, as discussed hereinafter. This structure anchors the frame to the driving mechanism and maintains proper support and separation to the components of the frame assembly 20. The rear base plate 44 further provides a situs for portions of the power delivery assembly 26 and the control assembly 30.

The base portion 32 is pivotally connected to the central portion 34 by a left tube hinge 58 and a right tube hinge 59, situated at the respective rear ends of the left base spar tube 38 and the right base spar tube 40. The relative rotational positions of the base portion 32 and the central portion 36 may be fixed by a tube hinge locking structure 60. Different rotational orientations may be desirable to accommodate specialized golf bags 12, although the approximately right angle orientation of FIG. 3 will be adequate for most purposes. As shown in FIGS. 1 and 3, the preferred form of tube hinge lock 60 utilized in the preferred embodiment 10 is a form of a locking brace adapted to achieve this orientation. Once the central member is fully extended away from the base member the locking mechanism (brace) 60 locks the central portion 34 in the illustrated position, roughly perpendicular to the base portion 32.

The central portion 34 includes a left central spar tube 62, a right central spar tube 64, each of which includes an angle tube portion 66. The central spar tubes have the same general shape as the base spars, and like the base spars are arranged to be parallel to each other. The "wave" shape shown in for the spar tubes is for aesthetic purposes and is not in any way critical to the function of the structure. The central spars tubes 62 and 64 are positioned closer to each other than are the base spar tubes 38 and 40 such that they will nest parallel to and inside in the store mode (see FIG. 2). The central spar tubes 62 and 64 are sharply bent at their upper (handle) ends to form the opposing angle portions 66. The angle tube portions 66 provide a mounting position for a curved bag side support bracket 68 which has an optional associated restraining cinch 69 (see FIG. 3) to hold the golf bag 12 in position on the cart 10 in the use mode, as shown in phantom in FIG. 1.

The two angle portions 66 are connected and spaced apart at their distal ends by a handle mount bracket 70, secured thereon. The handle mount bracket 70 permits rotation of the handle portion 36 with respect to the central portion 34 in order to facilitate the compact storage mode and also to permit adjustment for the height or comfort angle of the user. The handle mount bracket 70 includes a ratchet hinge 72 for connecting the handle portion 36 to the handle mount bracket 70. The ratchet binge 72 is adjustable and lockable in a variety of rotational positions to adapt to the height and desired comfort position of the particular user, as well as to lock the handle portion 36 in between the central portion 34 and the base portion 32 when the cart 10 is in the store mode. In the preferred embodiment 10 the handle portion 36 pivots about the ratchet hinge 72 over a 180 degree range. When in use, the typical arrangement is to have the handle portion 36 arrayed to be roughly perpendicular to the central portion 34.

The handle portion 36 includes a handle tube 74 which has a curved tubular shape having contours that roughly follow the shape of the central spar tubes (62 and 64) and the base spar tubes (38 and 40). The handle tube 74 engages the ratchet hinge 72 at a proximal end and has a grip portion 76 formed at the distal end. The grip portion 76 provides a position for the user to manually control the movement of the cart 10 and to manipulate it in the event of power failure. The grip portion 76 includes a controller receiving bracket 78, in the form oaf slot with a loop and hook pad 80 for mechanically coupling with a corresponding loop and hook pad affixed to a remote control unit 82 (discussed in more detail in conjunction with the control assembly 30). As will be described below, the golf bag cart can be controlled with the remote control unit 82 coupled to the handle 36, or with the remote control 82 carried in the hand away from the golf bag cart 10.

The frame member 20 is supported off the ground by the front free wheel assembly 22 and the drive wheel assembly 24. The front free wheel assembly 22 (which is in two mirror image left and right sections) is adapted to collapse and extend so as to dramatically alter the footprint of the cart assembly 10 between the use and store modes, contrasting FIGS. 1 and 2. In the use mode of FIG. 1, each of the left and right portions of the free wheel assembly 22 is fully extended to provide a wide footprint and very stable rolling and stationary support, while in the store mode of FIG. 2, the free wheel assembly 22 is retracted to provide a small storage footprint.

The key to the retractability and stability of the free wheel assembly 22 is the vertically offset side parallelogram positioner 90 (see FIGS. 4a and 4b, particularly) two opposing ones of which are used to connect a left front wheel 92 and right front wheel 94 respectively to the sides of the front base buttress 42 adjacent to the left base spar tube 38 and the right base spar tube 40. The parallelogram positioner 90 provides precise folding control and support with minimum structure.

The parallelogram positioners 90 associated with each of the front wheels are essentially congruent and each includes an axle tube 96 pivotally connected at its proximal end to the front base buttress 42 and at its distal end to an axle member 98. The axle member 98 provides the rotationally stationary structure upon which the respective free wheel (92 or 94) will rotate, unencumbered by any rotation restricting or enhancing mechanisms. A positioning rod 100 is disposed rearward of, vertically below, and horizontally parallel to the axle tube 98 and held in such position by a frame end pivot bracket portion 102, formed as a portion of the front base buttress 42 and by a wheel end pivot bracket 104, depending rearward and below the axle member 98. The pivot brackets 102 and 104 are attached via pivot pins 106 at four points to the ends of the positioning rod 100 and opposing positions on the axle tube 98. This structure maintains rigid vertical positioning while allowing horizontally planar folding of the free wheel assembly components under and against the sides of the frame assembly 20. The manner in which the parallelogram positioners 90 pivot with respect to the frame and the wheels ensures that the wheel members 92 and 94 are held in an orientation which is parallel to the vertical bisecting plane 18 in the extended use mode (FIGS. 1 and 4a), the collapsed store mode (FIG. 2) and positions intermediate these extremes, such as the partially collapsed orientation of FIG. 4b). When fully collapsed, as in FIG. 2, the positioning rod 100 will be underneath the axle tube 96.

A wheel lock 108 is provided to prevent unintended collapsing of the parallelogram positioner 90. The wheel lock 108 of the preferred embodiment 10 is in the form of a ratchet lever pivotally mounted on the axle tube 94 at a position offset distally from the front base butters 42. The wheel lock 108 is provided with a spring 110 (shown in phantom in FIG. 4a) to continually rotationally urge the engagement of the wheel lock 108 with a catch wedge portion 112 formed on the front base buttress 42. When the free wheel assembly 22 is in the use mode (FIG. 4a) the wheel lock 108 will be urged to engage the catch wedge and prevent collapsing. The engagement is automatic when the parallelogram positioner 90 is extended to the use mode, but the user will need to manually release the wheel lock 108 when it is desired to collapse the assembly. Although it is not ordinarily considered to be desirable or necessary, a secondary catch may also be provided to permit locking the assembly in the store mode.

The left and right free wheels 92 and 94 are constructed with the primary considerations of strength, durability and minimal weight being paramount. Each free wheel includes a wheel hub 114 and a wheel rim 116. The preferred wheel hub 114 is a solid cast member of light structural plastic having a cross sectional shape of a capital "T" with a thickening in the center to reinforce the axle. The wheel rim 116 is provided with traction texturing, either in the form of molded texturing or by a rubber sleeve, or the like. An axle pin 118 is provided to extend through the wheel hub 114 to the axle member 98 and the wheel is held in position by a hub nut 120. Although such may be optionally provided, the duty is not considered to be sufficient to necessitate any wheel bearings or bushings.

Figure 5:
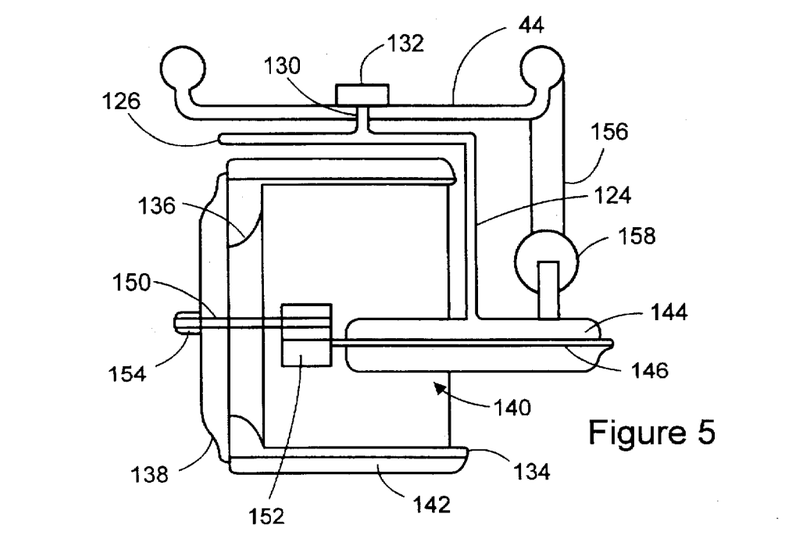
FIG. 5 is a front cross sectional view of the drive wheel assembly of a preferred embodiment.
Figure 6:
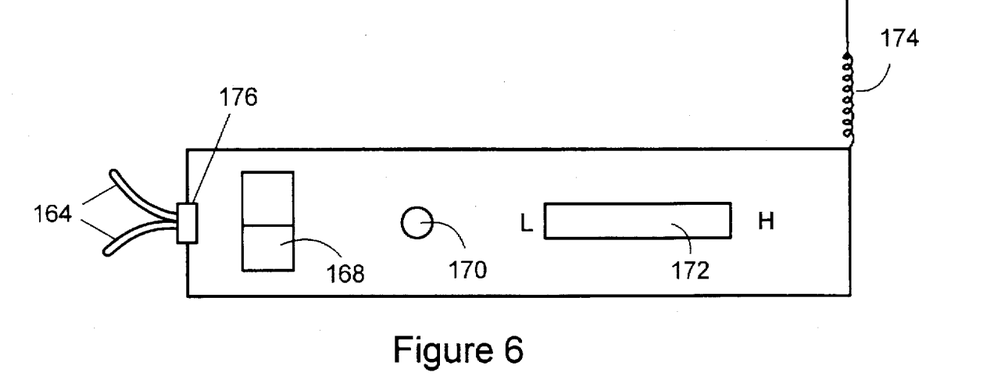
FIG. 6 is a rear elevational view of the control box portion of the invention.

The drive wheel assembly 24 is primarily illustrated in FIGS. 3, 5 and 6. The drive wheel assembly 24 is situated at the rear of the cart 10 and, with the power delivery assembly 26 provides the driving force. Further, the drive wheel assembly 24, in conjunction with the closely associated steering assembly 28, provides direction to the golf bag cart 10. In the preferred embodiment shown, utilizing rear wheel steering, the drive wheel assembly 24 is the only controlled portion of the overall apparatus which touches the ground surface, so any maneuvering or driving force occurs as a result of this contact.

As shown in the side elevational view of FIG. 3 and the cross sectional view of FIG. 5, the drive wheel assembly 24 includes a rear wheel 122 that turns about a drive shaft 124 extending from the power delivery assembly 26. The rear wheel 122 is mounted to depend from a pivoting wheel bracket 126 which is attached to the rear base plate 44 via a pivot shaft 128, a pivot bearing 130, and a pivot shaft nut 132. The drive wheel assembly 24 is maintained with the pivot shaft 128 strictly on plane with the vertical bisecting plane 18 in order to provide primary weight support but is free to rotate to a constrained degree to provide steering.

The structure of the rear wheel member 122 is itself unique since it is not vertically symmetrical, but is hollow, with a drive wheel rim 134 in the form oaf annular ring member attached at one extreme edge to a rigid circular disk 136. A hubcap 138 is provided over the exterior face disk 136 in the preferred embodiment 10, although this is optional. A cavity 140 is formed within the rim 134 and the disk 136, and an optional tire member 142 is applied about the rim 134 to provide traction, although the rim 134 itself may be provided with a traction surface which would obviate the need for a tire 140.

The motive force for turning the drive wheel 122 is provided by the power delivery assembly 26, and particularly by a drive motor 144 situated within the cavity 140. The drive motor 144, as controlled by the control assembly 30, provides rotational force to move the golf bag cart 10 about the course. A gearbox 146 reduces the rotational speed from that of the motor 144 to one more appropriate, and with sufficient torque, for the drive wheel 122.

The drive motor 144 is a dc electric motor having a horizontally oriented first drive shaft 148 extending therefrom. The first drive shaft 148 extends into the gear box 146 and a second drive shaft 150 extends out of the gearbox 146. A set of reduction gears 152 within the gearbox 146 convert the rotation of the first drive shaft 148 to a slower and higher torque rotation of the second drive shaft 150. The rear drive wheel 122 is attached to the second drive shaft 150 which passes through the origin point of the disk 136 and the hubcap 138 and is secured in position by a hub nut 154. In this manner the rear drive wheel 122 rotates under direct drive from the second drive shaft 150. The manner in which this is controlled is described hereinafter.

The steering assembly 28 of the preferred embodiment 10 is best illustrated in FIGS. 3 and 5. The embodiment of the steering assembly 26 shown operates on the rear drive wheel directly, thus obviating any need for the front wheels (92 and 94) to have a turning capability. It is understood that other embodiments are contemplated, including steering mechanisms in which the front wheels are turned and the drive wheel remains aligned within the vertical plane 18 but such are not shown herein.

The preferred steering assembly 26 shown in the drawing includes an anchor bracket 156 which is either an integral part of, or is firmly attached to the base portion 32 of the frame assembly 20, in this case being secured to the interior facing surface of the right base spar tube 40. A solenoid 158 is attached to the anchor bracket 156 by a pivot pin attachment 160 so that the solenoid is permitted to pivot slightly in a generally horizontal fashion while remaining vertically stationary. The solenoid 158 includes a driving arm 162 positioned axially within the solenoid 158 in such a manner that the driving arm is axially extended or retracted in response to electrical activation of the solenoid 158. The driving arm 162 is a rigid, straight structure that extends from within the solenoid to the rear drive wheel assembly 24, where it is pivotally attached to the motor bracket 124 at a steering bracket portion 163. A pivot pin 160 is used to provide the same degree of freedom of motion on the wheel end as on the end attached to the anchor bracket 156.

The solenoid 158 is activated by the control assembly 30 to either push or pull the driving arm 162 within the solenoid 158. If the driving arm 162 is pushed out of the solenoid 158, the rear drive wheel assembly 24 correspondingly turns to the right. Conversely, if the driving arm 162 is pulled toward the solenoid 158 the rear wheel assembly 24 turns to the left. This turning of the rear wheel assembly 24 changes the direction the cart 10 will travel. Electronic circuitry can also be applied to this type of solenoid-base steering to provide self correction and automatic centering.

The control assembly 30 includes the remote control unit 88, some physical electrical wiring 164 and a control box 166. The control box 166 is illustrated in an elevational view in FIG. 7, while the remote controller unit 88 is shown in a top plan view in FIG. 8. The control box 166 which is also illustrated in FIG. 3, and which is a portion of the power delivery assembly 26, as well as the control assembly 30, is a receptacle for the circuitry which is utilized to operate the invention.

The control box 166 is designed to be a simple structure on the exterior, since the user adjustable components of the invention are intentionally very limited. As shown in FIG. 6, the surface of the control box 166 includes an on/off switch 168, a power indicator light 170, a battery level indicator 172, and an antenna 174. A wiring aperture 176 is provided to permit the various necessary wiring 164 to access the components within the control box 166.

The control assembly 30 is adapted to utilize a minimal amount of wiring 164 and to limit that to portions of the golf bag cart 10 which are not subject to stress during the folding and unfolding processes. For this reason, control communications are exclusively via radio channel. No wiring is provided to the remote control unit 88 or to any portion of the structure other than those attached to the base frame portion 32. The necessary wiring 166 extends from the battery 56 to the control box 166, and from the control box 166 to the drive motor 144 and the steering control solenoid 158. All of this remains in relatively constant position in all orientations and modes of the device.

Figure 7:
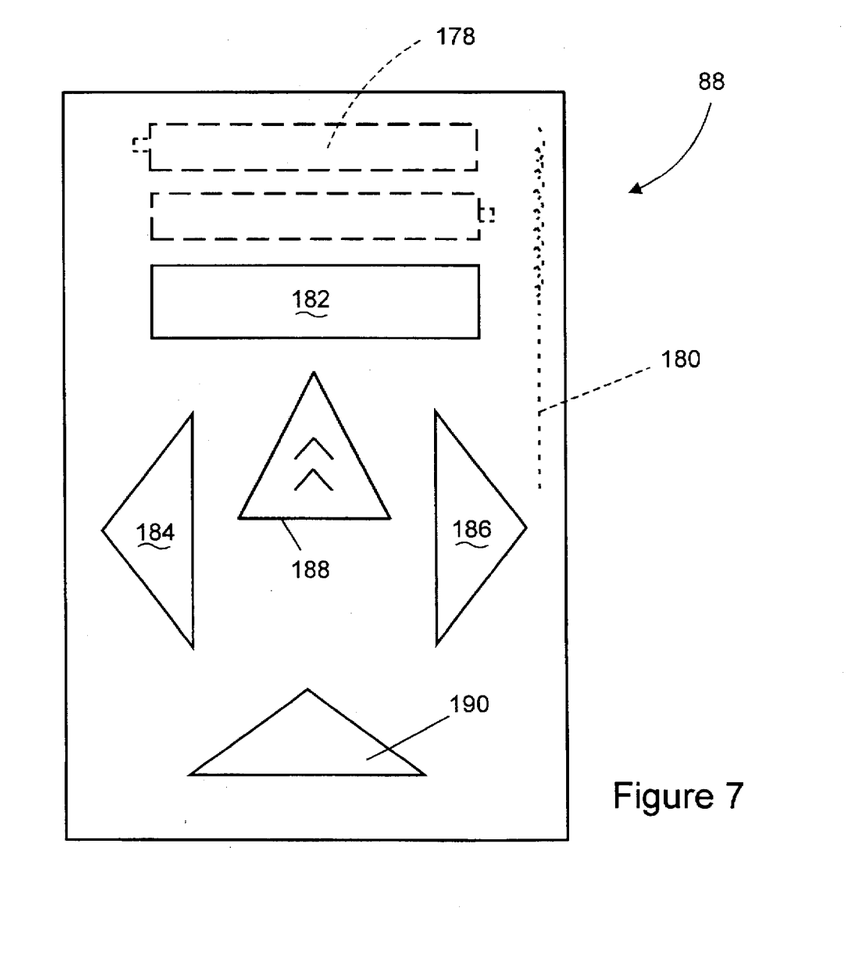
FIG. 7 is a top plan view of a handheld controller unit, shown mounted on the handle bracket.

The remote control unit 88 is illustrated in a top view in FIG. 7. The remote controller 88 is adapted to either be carried by the golfer when the golfer is physically away from the cart 10, or to be mounted on the controller bracket 78 on the handle 36, using a mating loop and hook fastener 80 to that present on the controller pad 78 (see FIG. 3). The remote control unit 88 is powered by battery cells 178, shown in phantom in FIG. 7 and control signals are transmitted to the control box 166 by an internally enclosed transmitter antenna 180 (also shown in phantom).

In keeping with the principle of simplicity of operation, a limited number of control options are provided to the golfer on the remote control unit 88. It has been found that the only controls required are a stop/start button 182, a left turn button 184, and a right turn button 186. However, since it is desirable to have more than one speed of movement available, additional controls in the form of a fast button 188 and a slow button 190 are also provided. These are illustrated in a generalized fashion in FIG. 7 and it is envisioned that the actual appearance of the remote controller unit 88 may differ substantially from that shown. Additional, or different control options are also envisioned.

Figure 8:
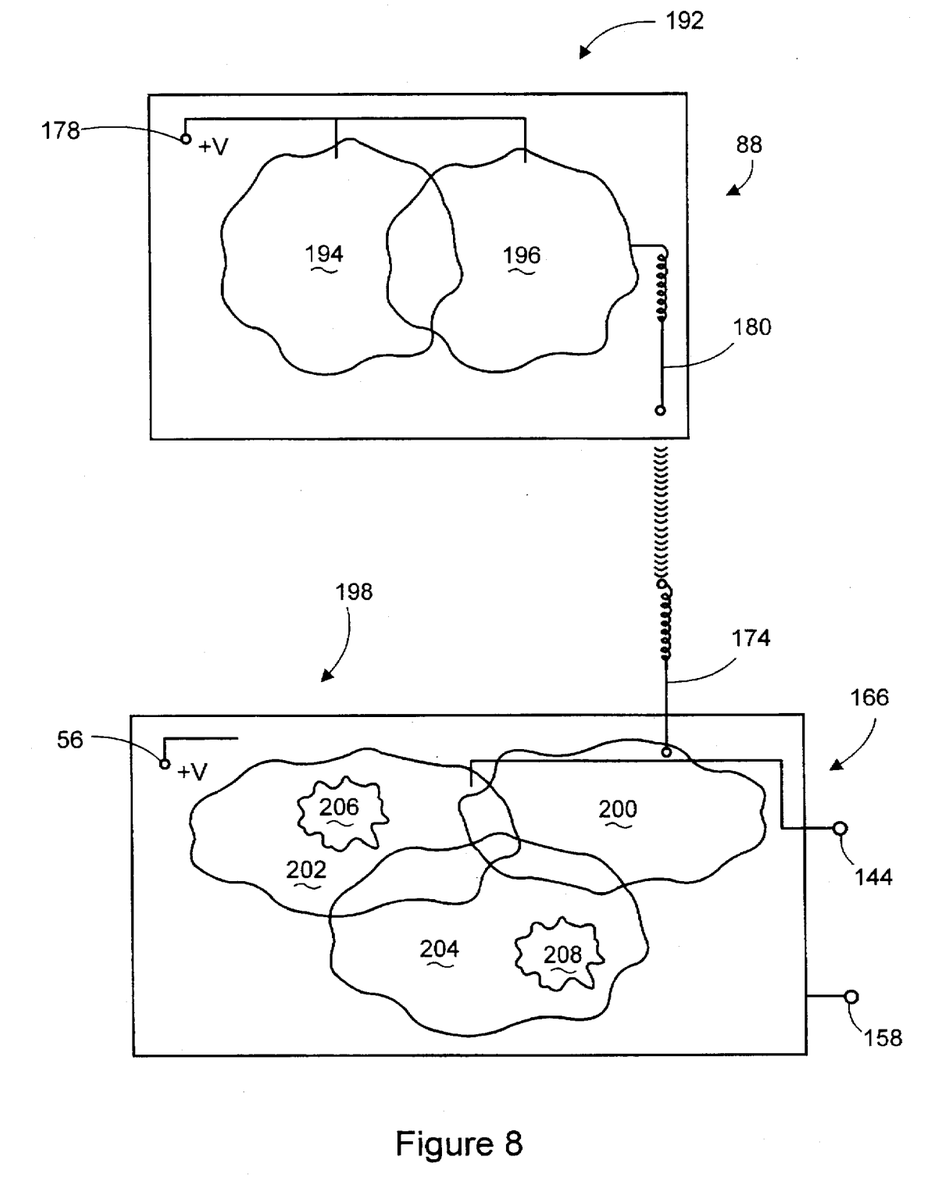
FIG. 8 is a generalized block diagram of the circuitry associated with the control and power delivery assemblies.

FIG. 8 represents a block diagram schematic analog of the circuitry utilized with the invention. It is understood that this is a rough presentation with the components defined by function. It is also understood that those skilled in the art would have no difficulty in devising any of a number of specific structures able to accomplish the general purposes involved.

In order to operate properly, the remote controller unit 88 is provided with remote control circuitry 192, contained in the interior of the unit, and powered by a portable power source, in this case the battery cells 178. The remote control circuitry 192 includes interpreter logic 194 and transmitter control logic 196. The interpreter logic receives input from depression of any of the buttons on the remote control unit 88 and interprets such input in order to instruct the transmitter control logic 196 as to the nature of radio signals to transmit for reception by the control box 166.

In the preferred embodiment 10, the interpreter logic 196 interprets the buttons in different manners. In this version, the primary power on/off is controlled at the control box 166 by the main on/off switch 168, and is independent of the remote controller unit 88. This unit is always active and does not require a separate switch. However, no output is generated until the buttons are activated. The stop/start button 182, the fast button 188 and the slow button 190 are toggle type switch logic, with activation and deactivation being accomplished by alternate depressions of the button. On the other hand, the logic and transmitted signals associated with the left turn button 184 and the right turn button 186 are only generated during the interval in which depression contact is maintained, so that a continuing turn requires continuous pressure on the associated button.

The signals generated and transmitted by the transmitter antenna 180 are delivered, via the receiver antenna 174 to the control box 166 where a generalized control box circuitry 198 is situated. The control box circuitry 198 is powered by a power source, in this case the battery 56 (possibly with an intermediate voltage adjustment) and is used to control the outputs to the drive motor 144 and the solenoid 158, thus controlling the motive power (forward motion) and the steering of the golf bag cart 10.

The preferred control box circuitry includes receiver logic 200, power distribution logic 202 and steering logic 204. In addition, two control features are critical enough to include separate identification. These are a braking sublogic 206 which is a part of the power delivery logic 202 and a self-centering sublogic 208 which forms a portion of the steering logic 204.

The receiver logic 200 receives radio input from the paired remote controller unit 88 (both units having been tuned to a "locally unique" waveform pattern) and delivers appropriate instructions to either or both of the power distribution logic 202 or the steering logic 204. These portions then respectively control the speed of rotation (including nonrotation) of the drive motor 144 and the degree and direction of extension of the driving arm 162 of the solenoid 158. In the preferred embodiment 10, the power delivery sublogic 202 and the steering sublogic 204 both include ramping capability to avoid abrupt status changes.

The braking sublogic 206 is utilized to prevent cart runaway problems. On downslopes a loaded wheeled device while tend to roll without power assistance and can result in lost control. The braking sublogic is utilized to provide feedback to drive motor 144 in a manner such that the drive motor 144 actually works as a brake on rotation of the rear drive wheel 122 when the rotational velocity thereof exceeds that provided by the motor 144. The structure of the drive motor 144 is also such as to provide resistance to turning when the power is turned off. However, this resistance is intentionally limited, since it desired that the user may be able to manually operate the cart 10 with a dead battery, or the like.

The self-centering sublogic 208 keeps the cart 10 traveling along the path of the bisecting plane 18 except when intentionally turned by the user. Thus, the self centering logic provides for a damped return of the rear drive wheel 122 to alignment with the bisecting plane 18 at all times when turn signal from the remote controller unit 88 is not being sent. When no power is present, as in the dead battery case, the steering control is free to facilitate manual control.

The powered cart for golf bags 10 of the present invention is to be constructed of strong materials in order to withstand substantial usage, since many golfers who would wish a device such as this are on the course several times per month, and in some cases, daily. Lightweight materials are also of great importance, primarily for ease of use and storage, but also for power consumption minimization. For these reasons the primary materials are aluminum for the frame structures and high strength plastics for wheels and the like. The dimensions are selected to conform to the ordinary golf bags found on the marketplace and to fit into standard storage and transport facilities.

In addition to the above mentioned examples, various other modifications and alterations of the dimensions, materials, orientation and usages may be made without departing from the invention. Accordingly, the above disclosure is not to be considered as limiting and the appended claims are to be interpreted as encompassing the entire spirit and scope of the invention.

INDUSTRIAL APPLICABILITY

The powered golf bag cart 10 of the present invention is intended to be utilized by any golfer who does not wish to ride themselves, and thus lose the exercise benefit, during a round of golf, but who wishes to avoid the physical strain of transporting the clubs. The cart 10 is adapted to suppost and precisely transport a loaded golf bag 12 under precise control from the golfer. It is also adapted to exist in either an expanded use mode or a compact storage mode.

In actual use, the typical golfer will start with the golf bag cart 10 in an unloaded store mode (see FIG. 2) in the garage. In preparation for a round of golf, the golfer will load the compact cart 10, the golf bag 12, a freshly charged battery 56, and one or two remote control units 88, including battery cells 178 which have sufficient charge to last throughout the round, into the trunk of a car and transport them to a golf course.

Upon arrival and removal of the paraphernalia from the trunk, the golfer will convert the cart 10 to the use mode by unfolding the frame assembly 20. This is accomplished by rotating the central portion 34 out from between the spar tubes of the base portion 32 until the central portion 34 is substantially vertical (FIG. 1) where it is locked in position using the locking structure 60. The handle portion 36 is then rotated backward and upward to a desired orientation and secured by the ratchet hinge 72. Then the battery 56 is placed on the battery support bracket 54 and electrically connected to the wiring 164. After the golf bag 12 is placed on the cart 10 and secured in place by one or both of the restraining cinches 52 and 69, the golfer is ready to go.

The power system of the cart 10 is activated by manipulating the on/off swithc 168 to the "on" position. The golfer may then use the remote controller unit 188, either carried separately, remotely from the cart 10, or secured on the handle controller bracket 78 by mating loop and hook fasteners 80. The radio transmitted control signals are equally effective in either orientation to turn the cart 10 in any desired direction by judicious use of the left turn button 184 and the right turn button 186 and to go forward in any of three speeds, depending on the usage of the start/stop button 182, the fast button 188 and the slow button 190.

Although not as smooth or easy as an unpowered bag cart, the invention is adapted to be operable even without electrical power. The handle portion 36 is configured for gripping and manipulation and the entire structure is balanced in such a way that the golfer will be able to complete the round in the event of power failure or malfunction.

After the round, the golfer reverses the process to return the golf bag cart 10 to the store mode, recharges the battery 56 and is ready to face the course again on another day.

Because of the many convenience features, the durability and ease of use and the adapatabilty to a wide variety of golf bags and terrains, the powered golf bag cart 10 of the present invention is expected to appeal to a broad variety of users and to have industrial applicability and commercial utility which are both widespread and long lasting.

What is claimed is:

1. A powered golf bag cart for use in conjunction with a golf bag, comprising:

a collapsible frame assembly including a base portion having a rear end and a front end, a central portion and a handle portion;

a power delivery assembly mounted on said frame assembly;

a drive wheel assembly, depending from said frame assembly below said rear end of said base portion and actively coupled with said power delivery assembly so as to be turned thereby;

a free wheel assembly including two opposed wheel members;

a steering assembly for adjusting the orientation of said drive wheel assembly with respect to said frame assembly; and user operable control assembly means for controlling said power delivery assembly and said steering assembly, wherein said frame assembly is formed such that it may be folded into a compact storage mode wherein the central portion nests within the base portion and the handle portion nests within the frame assembly, and said free wheel assembly is formed such that it may be horizontally folded, and the golf bag cart may be expanded into a use mode wherein the portions of said frame assembly and said free wheel assembly fold outward and are secured in place.

2. The golf bag cart of claim 1 wherein:

said free wheel assembly includes a pair of parallelogram positioner components, one associated with each of the wheel members, to permit the wheel members to be disposed outward from said frame assembly during said use mode and folded inward against said frame assembly in said storage mode.

3. The golf bag cart of claim 1 wherein:

the golf bag cart is generally symmetrical about a vertical bisecting plane.

4. The golf bag cart of claim 1 wherein:

the drive wheel assembly includes a rear drive wheel having a cavity formed therein for receiving a rotary electrical motor, the motor having a drive shaft rotating so as to turn the drive wheel.

5. The golf bag cart of claim 1 wherein:

at least one detachable remote controller unit is provided such that said control assembly means may be operated by a user at a remote location from the golf bag cart.

6. The golf bag cart of claim 1 wherein:

said steering assembly includes a solenoid controlled driving arm.

\* \* \* \* \*